United States Patent [19]

Signoretto

[11] Patent Number: 5,645,240
[45] Date of Patent: Jul. 8, 1997

[54] APPARATUS FOR INSERTING FILM INTO A SPOOL

[75] Inventor: Roberto Signoretto, Milan, Italy

[73] Assignee: Systel International S.p.A., Milan, Italy

[21] Appl. No.: 637,344

[22] Filed: Apr. 25, 1996

[30] Foreign Application Priority Data

Apr. 28, 1995 [IT] Italy .................... VE95A0011

[51] Int. Cl.$^6$ .................... G03B 19/00; G03B 1/58
[52] U.S. Cl. .................... 242/332.4; 242/332.7; 242/357; 242/532.7; 242/533.2; 396/661
[58] Field of Search .................... 242/332.1, 332.4, 242/332.7, 337, 348.1, 357, 532.4, 532.7, 533.2, 534; 396/661

[56] References Cited

U.S. PATENT DOCUMENTS 5,347,338 9/1994 Weibel .................... 396/661 X
5,597,131 1/1997 Kaya .................... 242/532.4

Primary Examiner—John Q. Nguyen
Attorney, Agent, or Firm—Hoffman, Wasson & Gitler

[57] ABSTRACT

An apparatus for inserting film into a spool including: a magazine with a plurality of cells containing empty spools, an element rotating about a fixed shaft and supporting at its end at least one container arranged to receive by gravity a spool housed in a cell of the magazine, a unit for inserting a negative into the spool, the unit being located in a position different from a region in which the spool is inserted into the container, and a magazine into which spools carrying rewound file are inserted. The container is mounted rotatable relative to the rotary element, an apparatus being provided which for each rotation of the rotary element in one direction cause the container to undergo a similar rotation about its axis in an opposite direction.

15 Claims, 3 Drawing Sheets

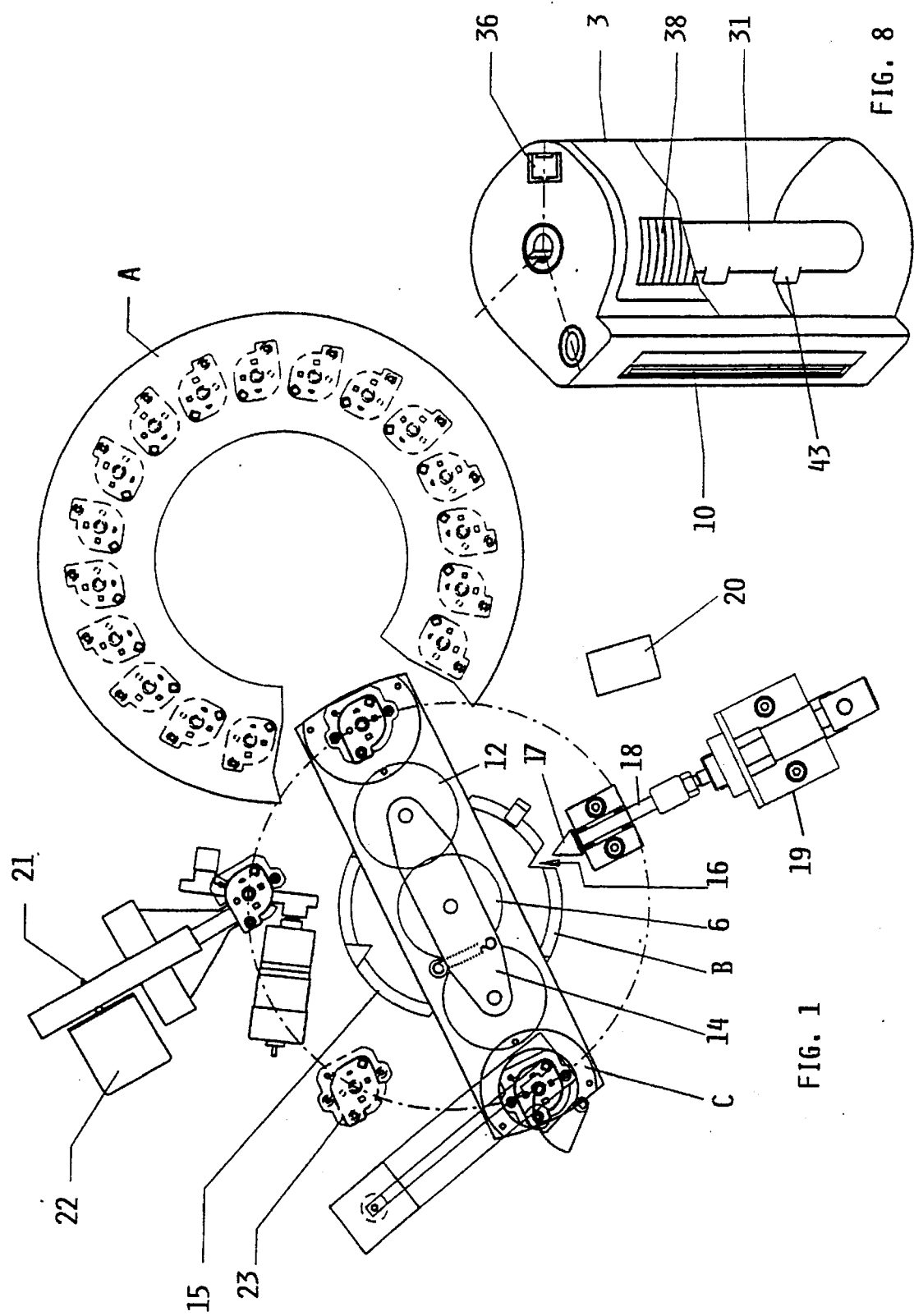

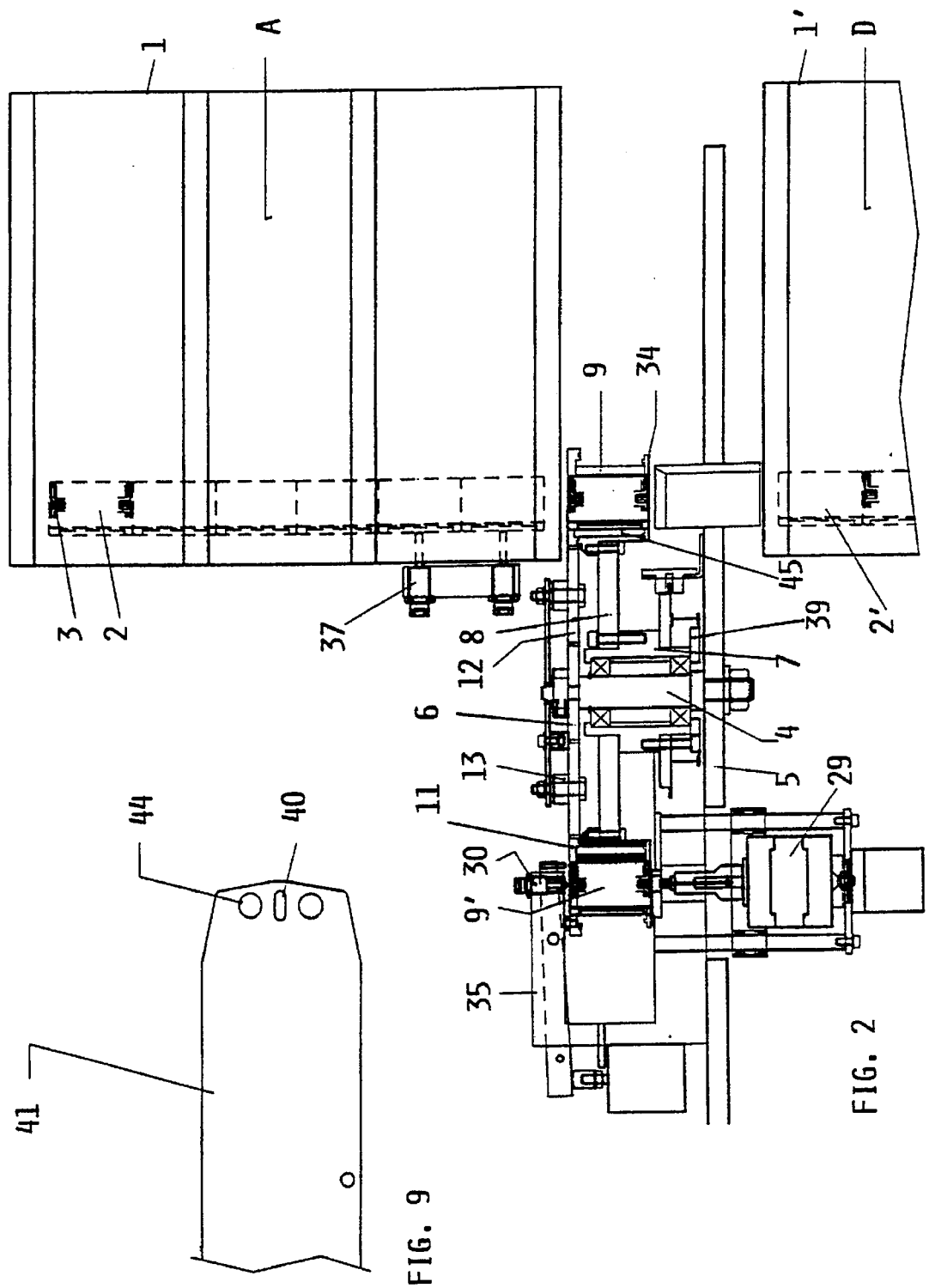

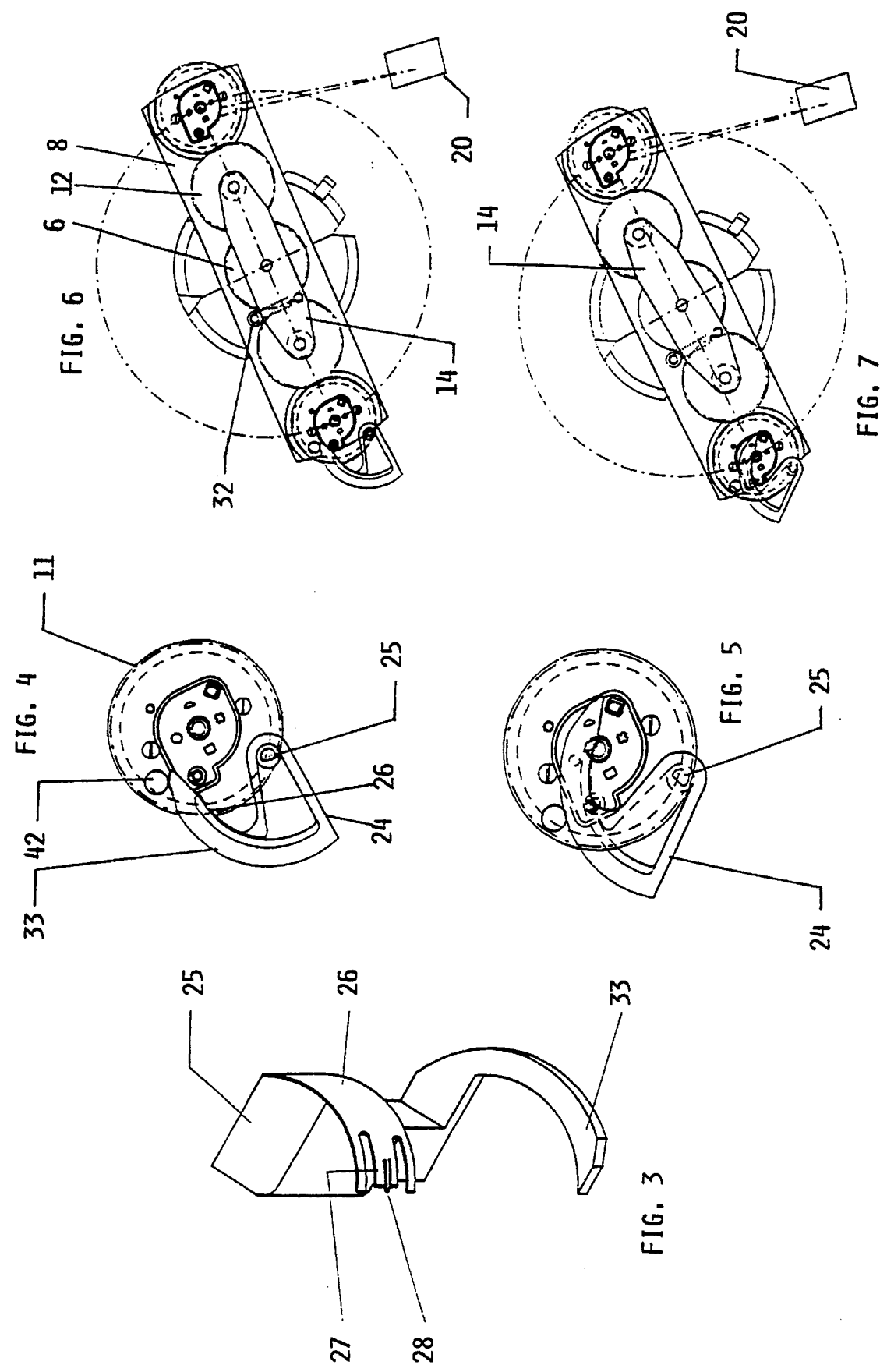

APPARATUS FOR INSERTING FILM INTO A SPOOL

FIELD OF THE INVENTION

This invention relates to an apparatus for inserting film into a spool.

DESCRIPTION OF THE PRIOR ART

The field to which the invention relates is the handling of already developed film. Film contained in a spool is rewound onto the core after exposure and sent to special laboratories for developing and printing. Within these laboratories the normal procedure is to extract the film from the spool and join the individual film pieces together on a reel to form the production batch. This reel then passes through the conventional developing and printing stages, the individual spools from which the film pieces were extracted being placed in a magazine, strictly maintaining the sequence of the relative film pieces.

BRIEF SUMMARY OF THE INVENTION

The object of the invention is to provide an apparatus which enables already developed film to be reinserted into its original spool.

This and further objects are attained according to the invention through an apparatus for inserting film into a spool, said apparatus comprising:

- a magazine with a plurality of cells containing empty spools,
- an element rotating about a fixed shaft and supporting at its end at least one container arranged to receive by gravity a spool housed in a cell of the magazine,
- a unit for inserting the negative into the spool, said unit being located in a position different from the region in which the spool is inserted into the container, and
- a magazine into which spools carrying the rewound film are inserted, characterised in that the container is mounted rotatable relative to the rotary element, means being provided which for each rotation of the rotary element in one direction cause the container to undergo a similar rotation about its axis in the opposite direction.

BRIEF DESCRIPTION OF THE DRAWINGS

A preferred embodiment of the present invention is further clarified hereinafter with reference to the accompanying drawings, in which:

FIG. 1 is schematic plan view of the apparatus of the invention;

FIG. 2 is a partial longitudinal section therethrough;

FIG. 3 is a perspective view of the insertion and connection device;

FIG. 4 is a plan view thereof taken during the insertion stage;

FIG. 5 is a plan view thereof taken during the connection stage;

FIG. 6 shows the rotary element during the insertion of the film into the spool;

FIG. 7 shows it during the connection stage;

FIG. 8 is a perspective view of a spool; and

FIG. 9 shows the leading end of the film to be inserted.

DESCRIPTION OF PREFERRED EMBODIMENTS

As can be seen from the figures, the apparatus of the invention comprises substantially a spool loading station A, a spool handling station B, a station C for inserting the film into and connecting it to the interior of the spool, and a spool discharge station D.

The loading station A and the discharge station D are vertically aligned and comprise a rotary magazine 1 consisting of a cylindrical annular body comprising a plurality of superposed cells of shape substantially suitable for housing photographic film spools 3.

The handling station B comprises a rotary device consisting substantially of a vertical shaft 4 rigid with a baseplate 5 and on which a gearwheel 6 is keyed. The shaft 4 is housed within a bush 7 provided with diametrically aligned arms 8 supporting at their ends two sleeves 45 in which there are housed two lowerly and upperly open containers 9, 9' of dimensions and shape substantially corresponding to those of the spools 3. Said sleeves 45 and containers 9, 9' comprise a vertical aperture which faces the movable window 10 in the spool 3 when this is housed in the container, and a second vertical aperture enabling the identification bar code of the spool to be read by a laser reader.

To the upper end of each container 9, 9' there is applied a ring gear 11 which engages a further gearwheel 12 which itself engages the gearwheel 6. The gears 6, 11 and 12 all have the same radius and the same number of teeth.

The gearwheels 12 are mounted idly on vertical pins 13 rigid with a plate 14 mounted idly at the upper end of the shaft 4. One end of a spring 32 is rigid with the arm 8, its other end being rigid with the plate 14.

Also rigid with the bush 7 there is a disc 15 provided with notches 16 for engaging a corresponding head 17 mounted at the end of a rod 18 of a pneumatic cylinder 19.

The handling station B also comprises:

- a laser unit 20 for reading the bar code of the spool to be filled,
- a unit 21 for discharging damaged empty spools and feeding a replacement spool, and an associated printer 22,
- a unit 23 for discharging those containers in which the film has not been completely rewound.

Station C for inserting film into the spool comprises substantially an insertion member 24 movable between a position of interference and a position of non-interference with the spool, under the control of a motor (not shown on the drawings).

Said member consists of a prismatic body pivoted on a pin 25 and extending into a curved portion 26, the end of which comprises two slotted seats 27 defining a central portion provided with a coupling tooth 28. A suitably shaped cam 33 is also rigid with the prismatic body.

The insertion unit also comprises an axially movable mandrel 29 and counter-mandrel 30 for rotating the spool core 31.

Finally, said unit comprises a conventional member (not shown on the drawings) for opening the movable window 10 of the spool and a rocker member 35 for depressing a tab 36 provided in the spool, as a permanent indicator that the processed film has been rewound.

The apparatus of the invention also comprises a microprocessor controlling the entire working cycle and operating the various actuators on the basis both of its own operational logic and of external signals received from various sensors which in themselves do not form part of the invention but will be referred to at appropriate points of the ensuing description of operation.

For a better understanding of the operation of the apparatus according to the invention, it will be assumed that all the spools 3 have been inserted into the magazine 1 and the film pieces 41 to be inserted are already wound on a reel (not shown on the drawings). The spools will have been inserted into the magazine such that their order of exit coincides with the order of presentation of film previously contained in them.

A sequential command fed to two pistons 37 facing the magazine 2 and engaging the spools causes the lower spool to fall by gravity into the interior of the container 9 which lies below said magazine.

When the spool has been positioned within the container and remains retained therein by the presence of a stop tooth 34 provided on the container base, the laser reader 20 reads the bar code 38 printed on the outside of the spool to verify that this corresponds to the code printed on the film to be inserted into its interior, this film being in the insertion station C.

A driven pulley 39 then rotates the bush 7 (in an anti-clockwise direction with respect to the drawings) which, due to the engagement between the gears 6, 11, 12, causes the container 9 to undergo a like rotation moment by moment about its axis but in the opposite direction, so that the window 10 in the spool 3 always faces the same direction.

As a result of this rotation, the container 9 transits in front of the unit 21 where, should the laser reader 20 have found that the bar code 38 printed on the container does not coincide with that of the film, it is temporarily halted to enable the spool to be replaced manually or automatically by a new one on which the printer 22 has printed the corresponding number present on the original spool.

This pausing of the container in front of the unit 21 is achieved by firstly halting the rotation of the bush 7 and then inserting the head 17 of the rod 18 into a corresponding notch 16 provided in the disc 15 to ensure that the support arm 8 for the container 9 is securely locked.

The container is replaced by disengaging the stop tooth 34, so that the container is able to fall by gravity and be replaced, again by gravity, with a new one originating from a magazine provided in that unit.

After effecting this possible replacement and then disengaging the head 17 from the disc 15, the rotation of the bush 7 brings the container to the film insertion station C, in which the following operations are effected in sequence:

the rotation of the bush 7 is halted and at the same time the arm 8 is locked by inserting the head 17 of the rod 18 into the corresponding notch 16, the spool window 10 is opened, the mandrel 29 and counter-mandrel 30 are made to engage the appropriate grooves provided in the core 31, the insertion member 24 is rotated, its coupling appendix 28 having previously engaged in a corresponding slotted hole 40 provided in the leading end (in reality the tail end) of the film 41 to be inserted into the spool. As a result of this rotation, the cam 33 interacts with a pin 42 rigid with the ring gear 11 to cause the container to undergo a small rotation in the clockwise direction (with reference to the drawings) to prevent the film sliding on the spool window 10 and to allow the teeth 43 projecting from the core 31 to correctly engage in the holes 44 provided in the film 41. Following this insertion, the plate 14 rotates angularly about the axis of the arms 8 in the opposite direction to the rotation of the prismatic element, overcoming the action of the elastic spring 34 (see FIG. 7), the insertion member is extracted from the spool by rotating it in the opposite direction, with the result that the elastic reaction of the spring 34 returns the plate 14 into longitudinal alignment with the arms 8, facilitated by abutment against a pin 15, the film is wound onto the core, the window 10 is closed, the rocker member 35 is operated to depress the tab and confirm that the winding of the processed film has been completed, the rod 18 is disengaged from the notch 16 in the disc 15, the bush 7 is rotated in the same direction to return the container 9 to its initial position.

It should be noted that during the insertion of the film into the container 9, the container 9' is in a position below the magazine A, so that the next spool present in the magazine enters said container 9' in the aforedescribed manner.

If problems are encountered in inserting the film into the spool in station C such that this insertion is not possible, the bush 7 is made to rotate clockwise to move the container 9 together with the spool into the discharge unit 21, where as already stated the spool is replaced with a new spool on which the same number as the original spool has been printed.

If the problems encountered in inserting the film into the spool are such that the film has been only partly wound on the spool, the bush 7 is made to rotate in the opposite direction and the container 9 is moved rearwards into the discharge unit 23 where the spool is extracted from the container together with the film partly wound on it to complete the operation manually.

When the container 9 has returned to a position below the magazine 1 of the loading station A, the stop tooth 34 is operated to enable the container with the rewound film to fall into cells 2' of the magazine 1' of the discharge station D lying below it.

From the aforegoing it is apparent that the apparatus for inserting film into a spool has numerous advantages and in particular:

it enables reinsertion to be effected rapidly because of the presence of the two-seat arm, it allows exact verification of the correlation between the spool and the film to be inserted into it, it enables action to be taken should difficulties arise in inserting the film into the spool or in coupling it to the core of this latter, because the spool can be inserted into and discharged from the container by gravity, no additional transporting members are required.

I claim:

1. An apparatus for inserting film into a spool, said apparatus comprising:

a magazine with a plurality of cells containing empty spools, an element rotating about a fixed shaft and supporting at one end at least one container arranged to receive by gravity a spool housed in a cell of said magazine, a unit for inserting said film into said spool, said unit being located in a position different from a region in which said spool is inserted into said at lease one container, and a magazine into which spools carrying said rewound film are inserted, wherein said at least one container is mounted rotatable relative to said rotary element, means being provided which for each rotation of said rotary element in one direction cause said at least one container to undergo a similar rotation about its axis in a opposite direction.

2. An apparatus as claimed in claim 1, wherein said rotary element consists of an arm rigid with a bush through which said fixed shaft is inserted.

3. An apparatus as claimed in claim 2, further comprising a disc provided with notches for engaging a head mounted at an end of a rod of a pneumatic cylinder, said disc being rigid with said bush.

4. An apparatus as claimed in claim 1, wherein said inserting unit comprises a conventional member for opening a movable window of said spool.

5. An apparatus as claimed in claim 1, wherein an arm is rigid with one end of a spring, said other end of which is rigid with a plate.

6. An apparatus as claimed in claim 1, wherein said inserting unit comprises a rocker member for tearing a tab provided in said spool.

7. An apparatus as claimed in claim 1, wherein said inserting unit is located in a position diametrical to a position in which said spool is inserted into said at least one container.

8. An apparatus as claimed in claim 1, further comprising a laser unit for reading a bar code of said spool to be filled.

9. An apparatus as claimed in claim 1, further comprising a unit for discharging damaged empty spools and feeding a replacement spool, a printer being associated with said unit.

10. An apparatus as claimed in claim 1, wherein said insertion unit comprises an insertion member movable between a position of interference and a position of non-interference with said spool, under control of a motor.

11. An apparatus as claimed in claim 10, wherein said insertion member comprises a prismatic body pivoted on a pin and extending into a curved portion provided with a coupling tooth.

12. An apparatus as claimed in claim 11, wherein a cam is rigid with said prismatic body.

13. An apparatus as claimed in claim 1, wherein said inserting unit comprises an axially movable mandrel and counter-mandrel for rotating a core of said spool.

14. An apparatus as claimed in claim 1, wherein said means for rotating said at least one container in a opposite direction to a rotation of said rotary element comprises a gearwheel keyed onto said fixed shaft, a ring rigid with said at least one container, and a further gearwheel provided between said gearwheel and ring gear, said gearwheels having a same radius and a same number of teeth.

15. An apparatus as claimed in claim 14, wherein said gearwheels are mounted idly on vertical pins rigid with a plate mounted idly at an upper end of said shaft.

* * * * *